United States Patent [19]

Genga, Jr. et al.

[11] Patent Number: 5,622,221

[45] Date of Patent: Apr. 22, 1997

[54] INTEGRATED ZONING CIRCULATOR WITH PRIORITY CONTROLLER

[75] Inventors: Richard A. Genga, Jr., East Greenwich; Hamid Pishdadian, Warwick; Michael McCarthy, Cranston, all of R.I.

[73] Assignee: Taco, Inc., Cranston, R.I.

[21] Appl. No.: 443,112

[22] Filed: May 17, 1995

[51] Int. Cl.$^6$ .................... F24F 3/00; F24F 3/08; F24F 5/00; F24F 11/00

[52] U.S. Cl. .................. 165/208; 165/209; 165/219; 165/247; 165/50; 237/8 R; 237/8 A; 236/9 A; 236/1 B; 236/37

[58] Field of Search .................... 165/208, 209, 165/219, 247, 50; 237/8 R, 8 A; 236/9 A, 1 B, 37

[56] References Cited

U.S. PATENT DOCUMENTS

| | | | |
|---|---|---|---|
| 2,949,234 | 8/1960 | Nessell | 236/11 |
| 3,154,247 | 10/1964 | Carlson | 236/9 |
| 3,425,485 | 2/1969 | Newton | 165/50 |
| 3,724,534 | 4/1973 | Weatherston | 165/12 |
| 4,192,455 | 3/1980 | Rasmussen et al. | 237/8 R |
| 4,530,395 | 7/1985 | Parker et al. | 165/16 |
| 4,633,908 | 1/1987 | Hattori et al. | 137/637.1 |
| 4,718,478 | 1/1988 | Huber | 237/8 R |
| 4,830,095 | 5/1989 | Friend | 165/22 |
| 4,886,110 | 12/1989 | Jackson | 165/22 |
| 5,042,431 | 8/1991 | Shprecher et al. | 122/448.3 |
| 5,261,483 | 11/1993 | Imaoka | 165/12 |
| 5,443,207 | 8/1995 | Genga | 237/8 R |
| 5,466,995 | 11/1995 | Genga | 318/3 |
| 5,540,414 | 7/1996 | Giordani et al. | 251/174 |

FOREIGN PATENT DOCUMENTS

| | | | |
|---|---|---|---|
| 0352401 | 1/1990 | European Pat. Off. | 165/50 |
| 2245967 | 1/1992 | United Kingdom | 165/50 |

*Primary Examiner*—John K. Ford
*Attorney, Agent, or Firm*—Fish & Richardson P.C.

[57] ABSTRACT

An integrated zoning circulator includes a priority controller, integral with the zoning circulator, for determining the priority given to the circulator in an individual zone of a multi-zone hydronic system. The zoning circulator also includes a priority circulator system for a multi-zone hydronic system having a zoning circulator at each zone, a plurality of control boxes each having a thermostat, one control box being associated with each circulator, and, a plurality of priority controllers, one priority controller being associated with each control box. Each priority controller, when activated, functions to assure that when the associated thermostat calls for the circulator to operate, other circulators in non-priority mode are prevented from operating simultaneously.

12 Claims, 6 Drawing Sheets

INTEGRATED ZONING CIRCULATOR WITH PRIORITY CONTROLLER

BACKGROUND OF THE INVENTION

The present invention relates to hydronic systems in which zoning circulators move heated water from a furnace to various heating zones of a building or to one or more heating zones and a heat exchanger and tank for heating domestic hot water.

For example, a heating system might have three heating zones, each with a separate zoning circulator, and a fourth zoning circulator moving heated water to a heat exchanger in a hot water tank. Usually, each zoning circulator has its own control box, which has supplied to it high voltage (115 VAC) lines for powering the zoning circulator and low voltage control lines from a thermostat.

It is often desirable in hydronic systems to be able to assure that if the associated thermostat is calling for the zoning circulator to operate then the other zoning circulators are prevented from operating. This permits, for example, the circulator operating the hot water tank, or a circulator that heats a particularly cold part of a house, to have higher priority than other zones.

A known control system for zoning circulators, sold by Argo, provides this priority function from a central control box in which the first of the relays is hardwired to have the highest priority, and whichever circulator is controlled via that relay is given the highest priority. To change priorities requires an electrician to change the wiring at the control box.

SUMMARY OF THE INVENTION

The invention features an integrated zoning circulator having its own priority controller integral with the circulator for determining the priority given to the zoning circulator in an individual zone of a multi-zone hydronic system.

The invention also features a priority circulator system, including a multi-zone hydronic system having a plurality of zones, a zoning circulator associated with each zone, each zone having a thermostat associated with the zoning circulator, and a plurality of priority controllers, each priority controller physically attached to an associated zoning circulator. The priority controller, when activated, functions to assure that when the associated thermostat calls for the zoning circulator to operate, other zoning circulators in non-priority mode are prevented from operating simultaneously.

Each priority controller is disposed within a controller housing physically attached to the motor housing of the zoning circulator. Each priority controller includes a manual switch, e.g., a conventional "off/on" switch, which a user of the system can easily activate, preferably without any tools. Accordingly, the invention allows priority to be changed by the consumer, who simply has to change the switch settings in the individual control boxes at the location of the associated integrated zoning circulator.

If desired, the system allows a plurality of priority controllers to be activated simultaneously, and thereby give those zoning circulators priority over the other circulators. Any circulator with an activated priority controller, if operating to deliver heat, will prevent any zoning circulator with a nonactivated priority controller from turning on its associated circulator.

In a preferred embodiment, each priority controller includes an electrical outlet port connected to the zoning circulator and electrical inlet ports for accepting low voltage thermostat leads, low voltage heat exchanger control leads, high voltage supply leads, and priority line power leads. The priority controller further includes a voltage transforming device (e.g., transformer) configured for transforming a high voltage delivered on the high voltage supply leads to a low voltage and an electrical switching device (e.g., relay) having low voltage activation input terminals. The switching device is configured to switch a low voltage switched output terminal and a high voltage switched output terminal when low voltage is supplied to the activation input terminals. Low voltage conductors within the housing connect the low voltage thermostat leads to the low voltage output of the voltage transforming device and to the low voltage activation terminals of the electrical switching device and connect the low voltage switched output terminal to the low voltage heat exchanger control leads. High voltage conductors within the housing supply the high voltage from the high voltage supply leads to the manual switch and connect the high voltage switched output terminal of the electrical switching device between the manual switch and the electrical outlet port.

Providing an individual controller at each zoning circulator is also advantageous because the individual priority controllers are inexpensive and easily installed, and thus if one controller malfunctions it can be readily replaced with minimal expense. Further, if one zoning circulator in the system fails, the zone operated by that circulator can be isolated and that zone can be heated/cooled by opening the valve controlling that zone and backflowing water through that zone. Because each priority controller includes its own transformer, if one transformer in a particular zone fails, only the zone governed by that priority controller will be affected, rather than causing a shut-down of the entire system, as results when a single, central transformer fails.

Other features and advantages of the invention will be apparent from the following description of preferred embodiments, and from the claims.

DESCRIPTION OF THE PREFERRED EMBODIMENTS

Figure 1:
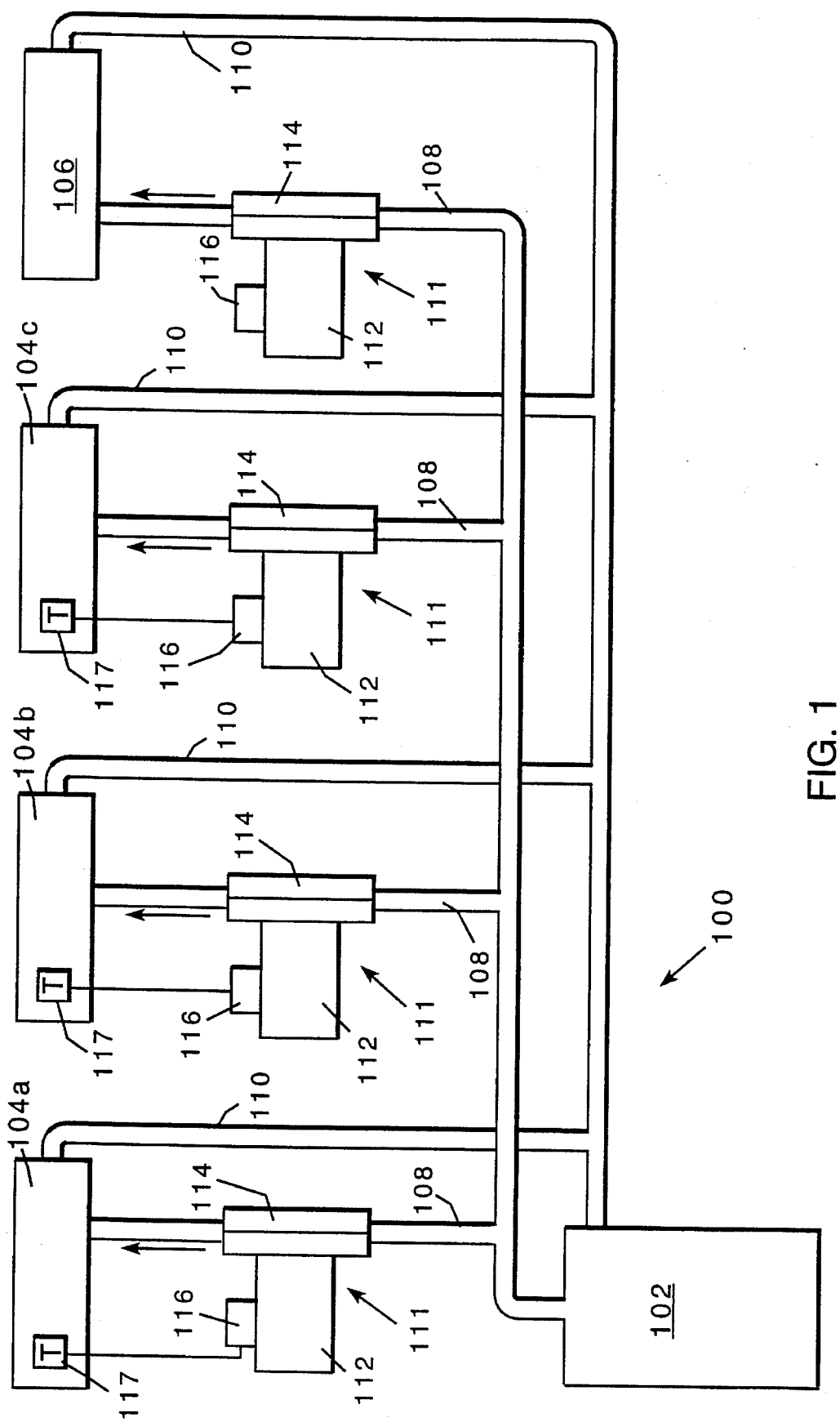
FIG. 1 is a schematic of a hydronic heating system having a number of integrated zoning circulators.

A hydronic heating system 100 for moving heated water from a furnace 102 to various heating zones 104a, 104b, 104c of a building and to a hot water tank 106 is shown schematically in FIG. 1. In addition to the furnace 102 and lines 108, which carry heated water from the furnace, and lines 110, which return it to the furnace, the system includes a separate zoning circulator 111 for the hot water tank and each heating zone. Each zoning circulator includes a circulator motor 112 and an impeller casing 114. Each circulator motor is actuated by a controller 115 enclosed in a control box 116 and physically integrated with the motor. Each controller has supplied to it high voltage lines for powering the zoning circulator and low voltage lines from a thermostat 117 located within the zone. An earlier design for such an integrated controller is disclosed in co-pending U.S. application Ser. No. 08/091,214, now U.S. Pat. No. 5,443,207, hereby incorporated by reference.

Figure 2:
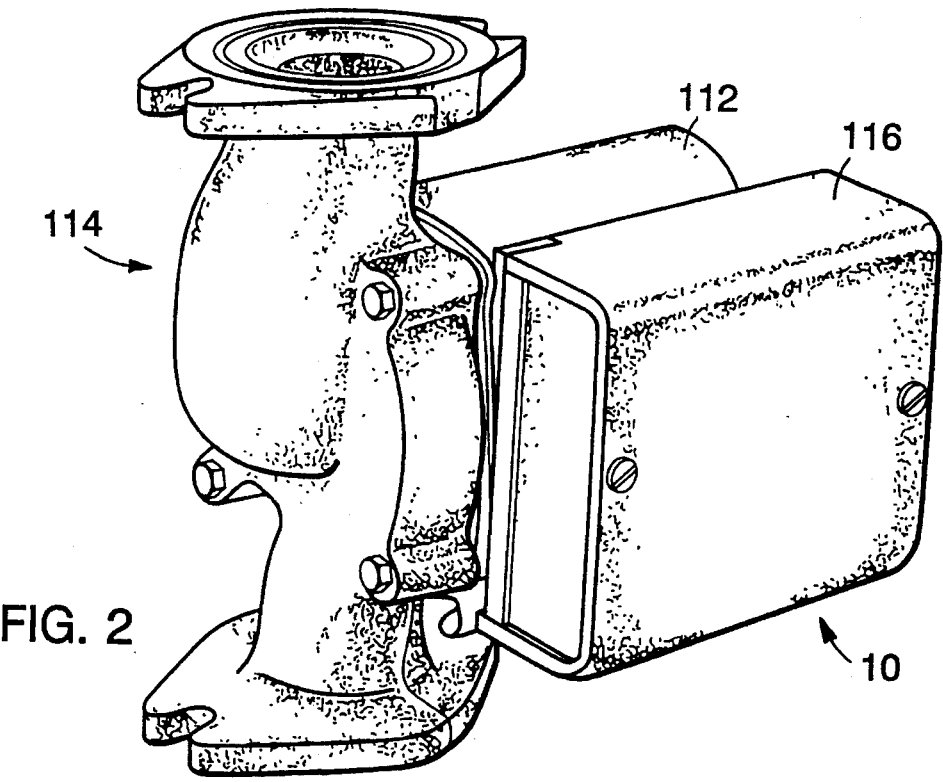
FIG. 2 shows a perspective view of the preferred embodiment of the integrated zoning circulator.
Figure 3:
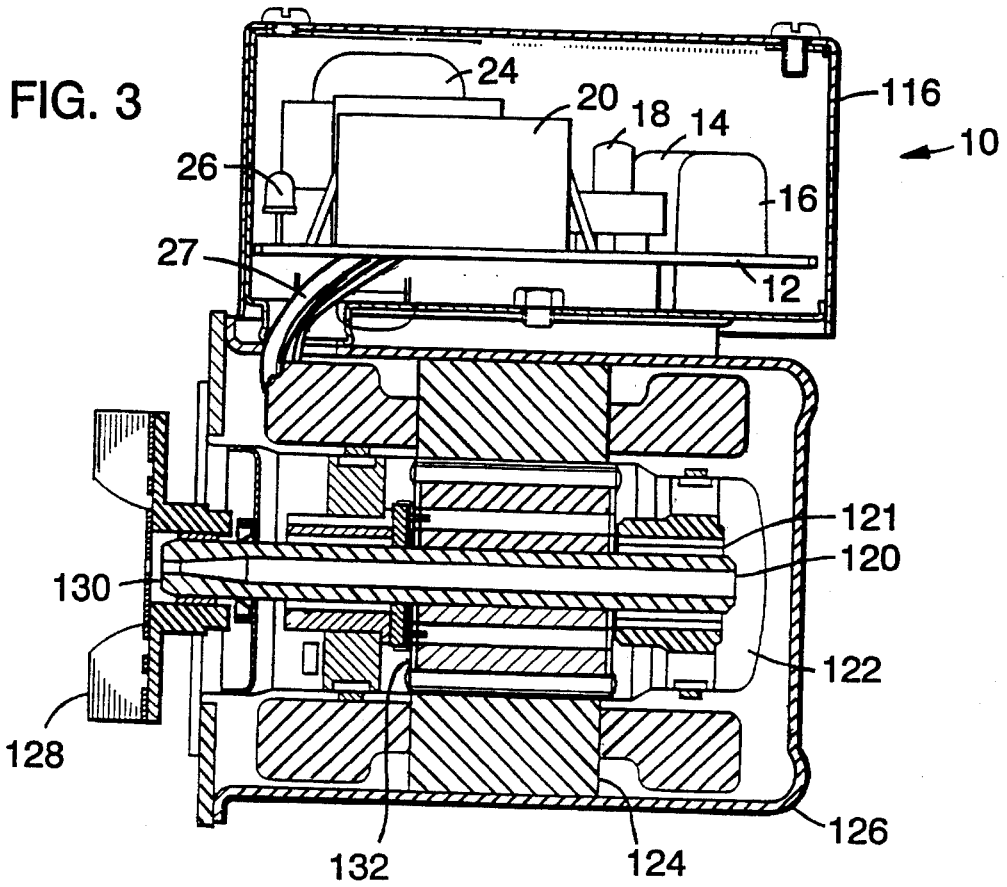
FIG. 3 shows a sectional plan view of the zoning circulator motor and controller.

As shown in FIG. 2, the zoning circulator comprises, generally, a motor 112, a controller 115, and an impeller casing 114, otherwise known as a volute.

with reference to FIGS. 2 and 3, the motor 112 is of the "wet-rotor" type, with a hollow shaft 120, water lubricated bearings 121 which is enclosed in a rotor housing 122, preferably a replaceable cartridge. The rotor housing 122 containing the rotor assembly is located in the center of the stator 124, which is contained within the motor housing 126. An impeller 128 mounted to one end 130 of the rotor shaft protrudes into the impeller casing 114 and performs the pumping action. When the windings 124 are electrically excited, the magnetic field created interacts with the windings 132 of the rotor, causing rotor 132 and shaft 120 to rotate and hence the impeller 128.

According to the invention, each controller 10 includes a priority switch (described below) which, when activated, functions to assure that if the associated thermostat is calling for the zoning circulator to operate then the other zoning circulators are disabled.

Figure 4:
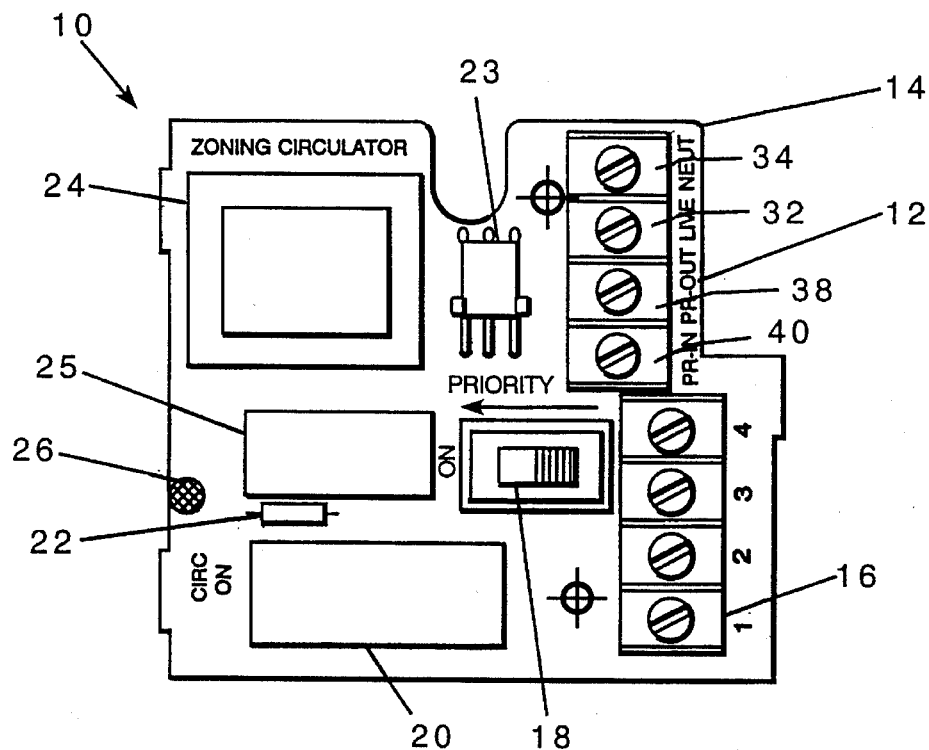
FIG. 4 is a top view of the circuit board of a priority controller according to one embodiment of the invention.
Figure 5:
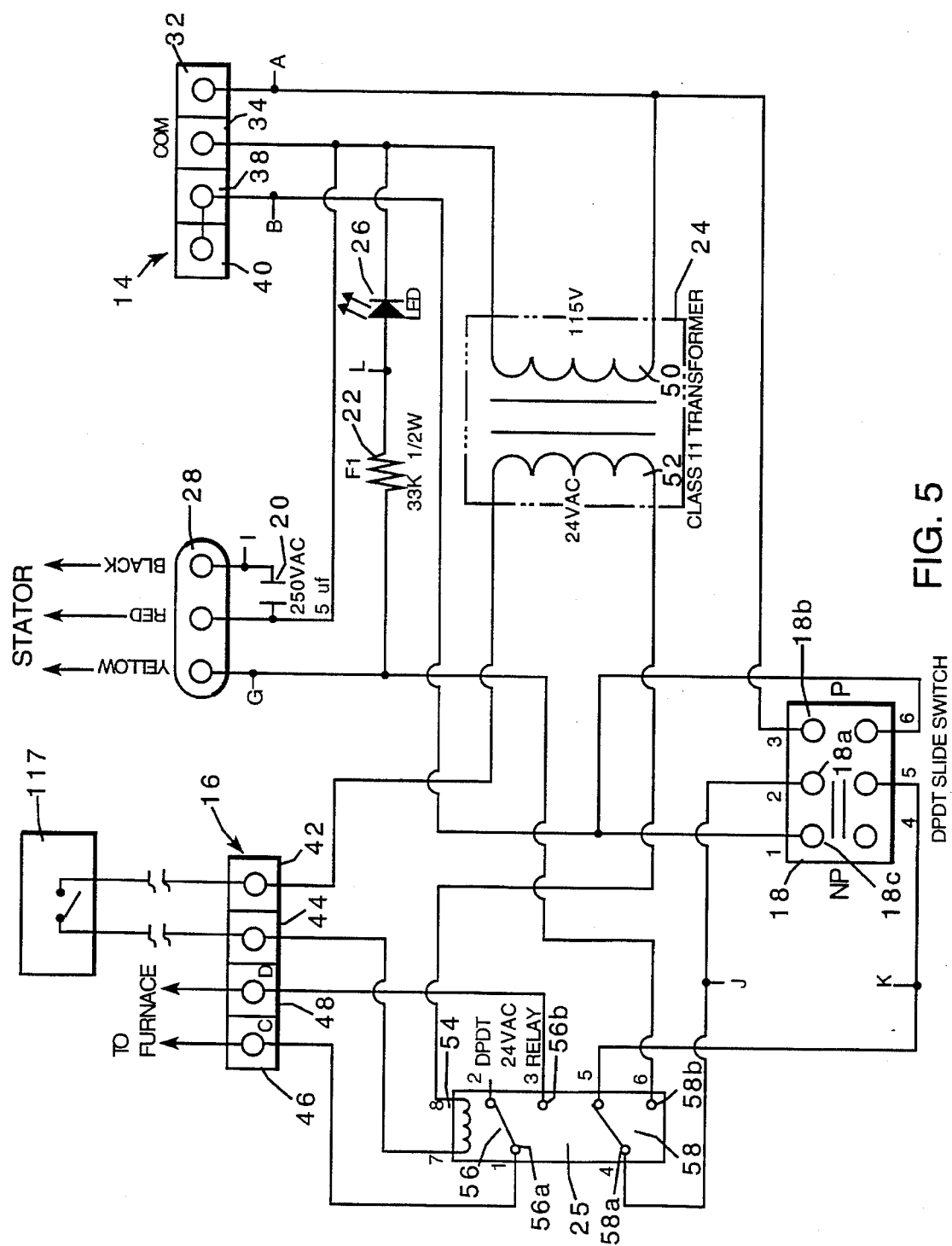
FIG. 5 is a schematic of the circuitry of a priority controller according to one embodiment of the invention.

Referring to FIGS. 3–5, a preferred priority controller 10 of the invention is shown with its associated circuitry. Priority controller 10 includes circuit board 12, on which are mounted a pair of terminal blocks 14, 16, priority switch 18, a capacitor 20, a resistor 22 (preferably 33K –½ W), a 115 V/24 V transformer 24, a relay 25, an LED lamp 26, and a male header 28 which is connected via lines 27 to a stator 124 of zoning circulator 111. The priority controllers for each zone are wired into a priority circulator system as shown schematically in FIG. 6 (only two are shown). The 115 VAC line voltage is provided to each priority controller, in parallel, to terminals 32, 34 of each terminal block 14 of the controller. In addition, the controllers are wired in "daisy-chain" fashion with the priority out connection (PR OUT) 38 of one controller connected to the priority in connection (PR IN) 40 of the next controller. In effect, because the PR IN and PR OUT terminals 38, 40 are electrically connected to each other, the priority lines of each controller are connected together. Terminal block 16 includes terminals 42, 44 for connecting thermostat 117 and terminals 46, 48 for connection to the furnace 102.

Referring to FIG. 5, transformer 24 receives the 115 VAC line voltage signal at primary winding 50 and steps the voltage down to a lower voltage signal (24 VAC) at secondary winding 52. The low voltage signal is provided to a secondary circuit having, in series, thermostat 117 and coil 54 of relay 25.

Priority switch 18 is a DPDT slide switch which in its priority position connects the 115 VAC line voltage directly to the stator of the zoning circulator and in the non-priority position prevents signal flow directly to the circulator. Relay 25 is double pole double throw (DPDT) and includes a pair of switches 56, 58 actuated by the flow of current through coil 54 when thermostat 117 is closed (i.e., when heat is required in the zone). Switch 56, in its closed position, activates furnace 102 which is connected to terminals 46, 48. Switch 58, in its closed position, allows the flow of line voltage, either directly from terminals 32, 34 or from the priority-in line terminal 38, through priority switch 18, and on to the zoning circulator. In this case, current passes through resistor 22 to illuminate LED 26.

Figure 6:
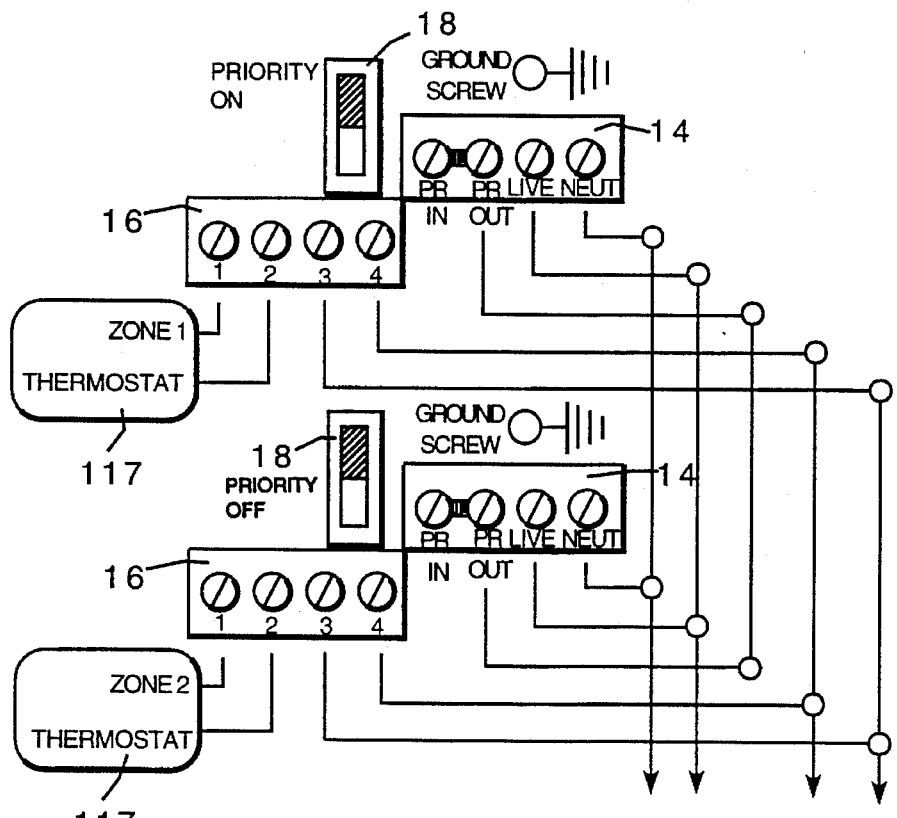
FIG. 6 is a schematic showing the interconnection between a plurality of priority controllers.
Figure 7:
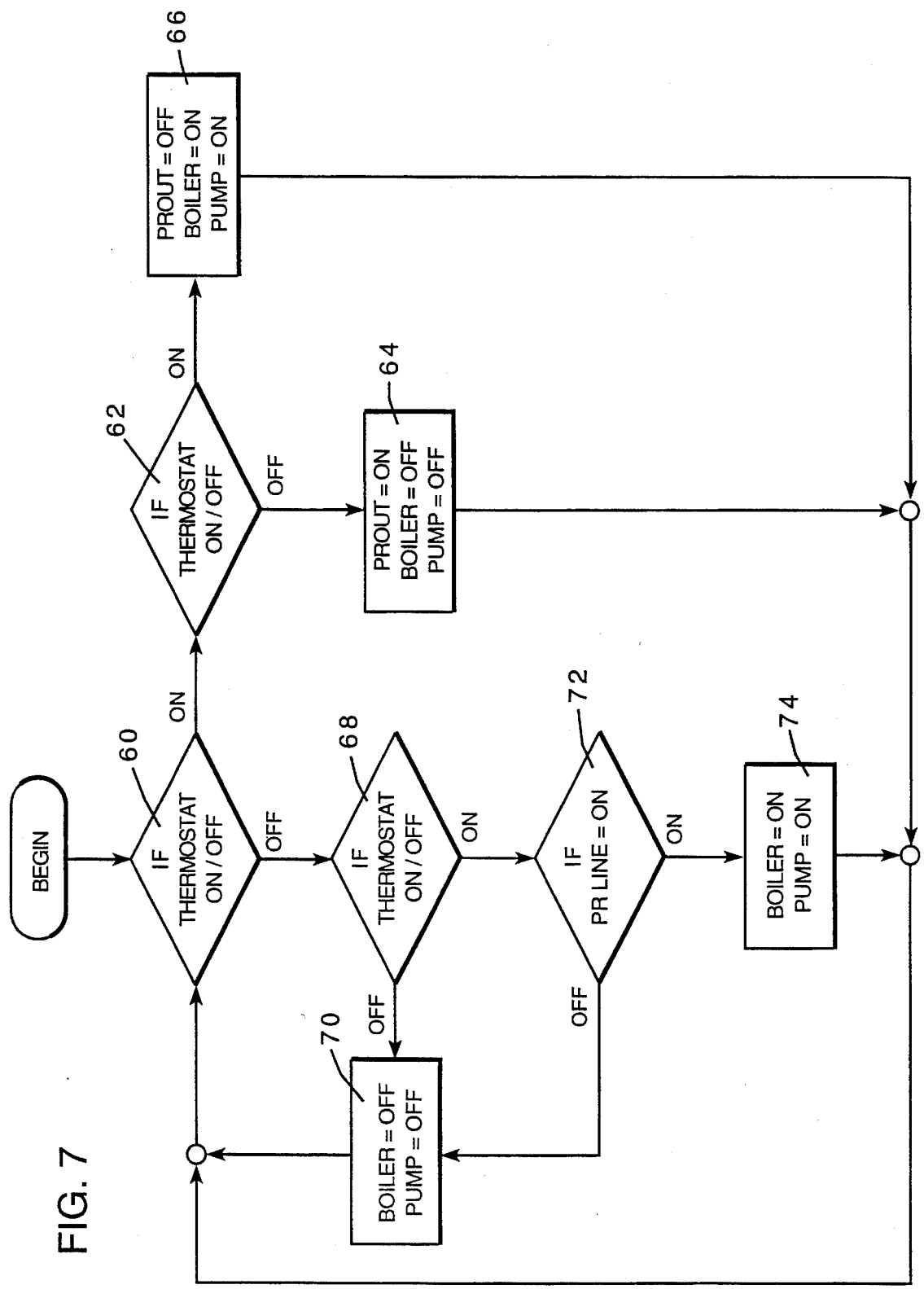
FIG. 7 is a flow diagram of the operation of the priority controller.

To establish priority for a desired zone in a multi-zone heating system wired as shown in FIG. 6, a user would simply switch the slide switch on the priority controller for the desired zone to "on", and switch the slide switches for the remaining priority controllers to "off". Referring to FIG. 5 and the flowchart of FIG. 7, the operation of the priority controller is as follows. A determination is made as to whether switch 18 has been placed in priority mode (step 60). If in the priority mode, a determination is made as to whether thermostat 117 is on or off (i.e., is heat required in the zone?) (step 62). If the thermostat is "off" switch 56 of relay 25 is open so that furnace 102 is not activated by the priority circulator in the zone (it may, however, be activated by another zone where the thermostat has been closed) and circulator 111 is not activated (step 64). If on the other hand, thermostat 117 is "on", relay switch 56 closes (contact between poles 56a and 56b) to turn the furnace on. At the same time, switch 58 closes (contact between poles 58a and 58b) to allow the line voltage signal from terminals 32, 34 to flow directly through contacts 18a and 18b of priority switch 18 and through relay 25 to actuate the circulator (step 66). Also, in this condition, the line voltage is prevented from supplying power to other non-priority controllers.

If priority switch 18 is "off", a determination is made as to whether the thermostat is "on" or "off" (step 68). If the thermostat is off, the circulator remains off (step 70). If, however, the thermostat is "on", the circulator in the zone can only be activated from power supplied along the priority line at terminal 38 (step 72). In other words, another priority controller of another zone that is in the priority mode has its thermostat open. In this case, power from terminal 38 passes through contacts 18a, 18c of switch 18, through poles 58a and 58b of switch 58 to actuate the circulator (step 74). Note that in this case, the furnace has been activated by the priority controller which is in priority mode.

In the embodiment described above, unless at least one priority controller is placed in priority mode, the line voltage is never provided to any of the zoning circulators in the system. For this reason, users of the system are advised to place at least one of the priority controllers in the priority mode. More than one priority controller can be placed in priority mode with those controllers having priority over non-priority controllers. However, if the user prefers that none of the controllers in the system have priority over any other, then all of the priority controllers should be placed in priority mode.

Figure 8:
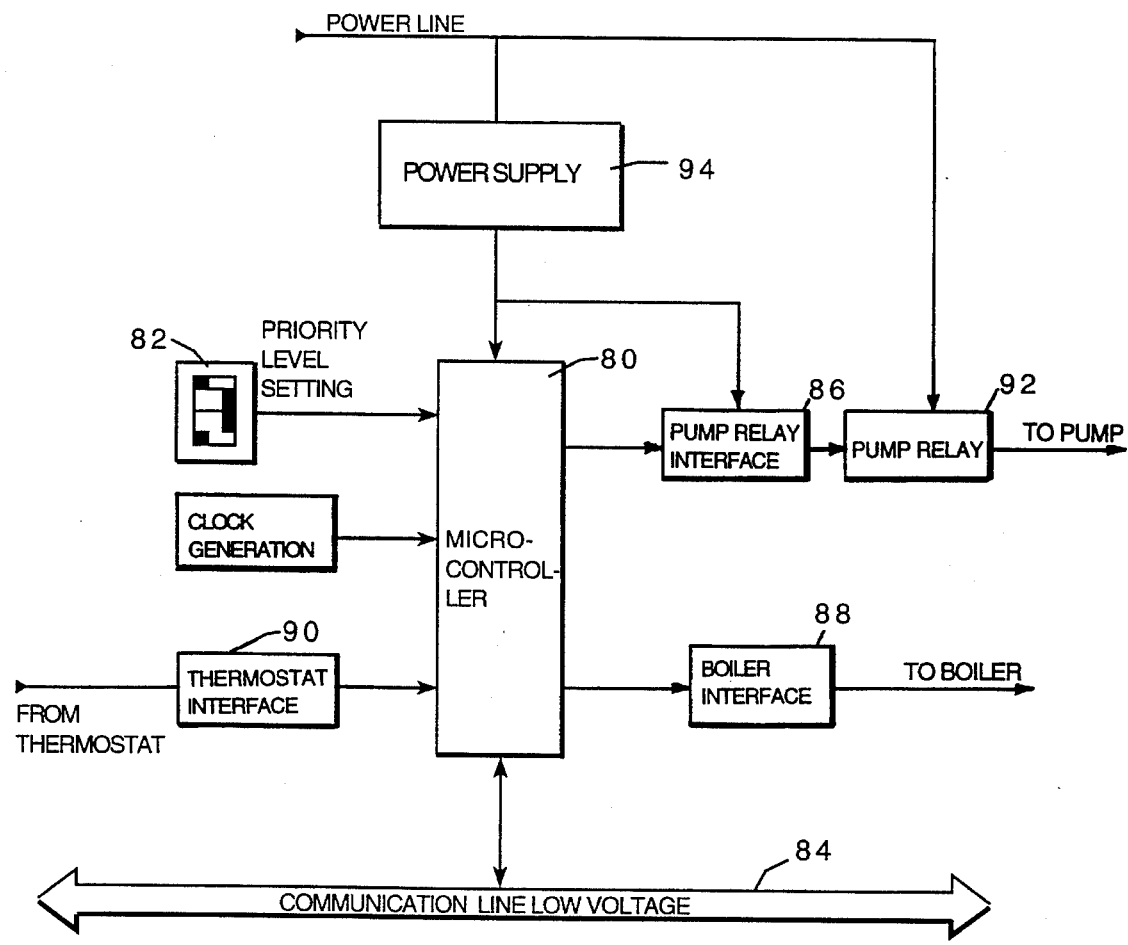
FIG. 8 is a block diagram of a priority controller having a microcontroller.

Referring to FIG. 8, relative priority between priority controllers in a multi-zone heating system can be established using a microcontroller 80 at each priority controller to provide the user with maximum flexibility in setting priorities. Priorities of the controllers are set with mini-DIP switches 82 and are communicated to the microcontrollers over bus 84. In this way, a priority controller in a given zone only has priority if its switch setting is of higher priority than other controllers desiring to be operated. Each microcontroller includes interfaces 86, 88, 90 for respectively transmitting/receiving information to and from a pump relay 92, furnace and thermostat. Each microcontroller also includes its own power supply 92. An important advantage of using a microcontroller is that the control signals are of much lower level (e.g., 5 V) than those used to control the circulator in the embodiment of FIGS. 5 and 6.

Other embodiments are within the claims. For example, although the invention has been describes in the context of a heating system, it is equally applicable in systems providing cooling, such as an air conditioning system.

What is claimed is:

1. An integrated zoning circulator associated with an individual zone of a hydronic heating or cooling system that includes a plurality of zones, each zone including a thermostat associated with the zoning circulator, the integrated zoning circulator comprising:

a wet-rotor circulator motor disposed within a motor housing, and;

a priority controller, for determining priority of operation for the integrated zoning circulator, said controller disposed within a controller housing integral with the motor housing said priority controller comprising:

a manual switch having a setting selectable by a user of the hydronic system for establishing the priority of operation for the zoning circulator relative to other zoning circulators in the system; and circuitry, connected to the zoning circulator and manual switch, adapted to operate the zoning circulator and to prevent simultaneous operation of zoning circulators in other zones that have manual switch settings of lower priority than the selected setting of the manual switch, when the thermostat, associated with the zone in which the integrated zoning circulator is disposed, calls for the zoning circulator in that zone to operate.

2. The integrated zoning circulator of claim 1 wherein when the manual switch has a setting of higher priority than switch settings of manual switches of integrated zoning circulators in other zones and the thermostat, associated with the zone in which the integrated zoning circulator is disposed, calls for the zoning circulator in that zone to be non-operational, the priority controller provides power to the priority controllers in other zones having lower priority to allow operation of circulators in those zones.

3. The integrated zoning circulator of claim 1 wherein said circuitry further comprises electrical inlet ports for accepting low voltage thermostat leads, low voltage heat exchanger control leads, high voltage supply leads, and priority line power leads, an electrical outlet port connected to the zoning circulator, a voltage transforming device configured for transforming a high voltage delivered on the high voltage supply leads to a low voltage, an electrical switching device having low voltage activation input terminals, the switching device configured to switch a low voltage switched output terminal and a high voltage switched output terminal when low voltage is supplied to the activation input terminals, low voltage conductors within the housing for connecting the low voltage thermostat leads to the low voltage output of the voltage transforming device and to the low voltage activation terminals of the electrical switching device and for connecting the low voltage switched output terminal to the low voltage heat exchanger control leads, and high voltage conductors within the housing for supplying the high voltage from the high voltage supply leads to the manual switch and for connecting the high voltage switched output terminal of the electrical switching device between the manual switch and the electrical outlet port.

4. The integrated zoning circulator of claim 3 wherein the electrical switching device is an electrical relay.

5. The integrated zoning circulator of claim 3 wherein the voltage transforming device is a transformer.

6. The integrated zoning circulator of claim 1 wherein said circuitry further comprises a microcontroller for controlling the operation of the zoning circulator on the basis of priority settings of manual switches of other priority controllers of the hydronic system.

7. The integrated zoning circulator of claim 1 wherein said wet-rotor circulator motor further comprises:

a stator disposed within the motor housing and sealed from the circulating fluid, a rotor housing disposed within the motor housing within the stator, the rotor housing being unsealed from the circulating fluid so that the fluid enters the rotor housing, a rotor disposed within the rotor housing and in contact with the fluid, and an impeller affixed to one end of the rotor, the stator and rotor configured with respect to one another so that the rotor is caused to rotate when the stator is energized;

an impeller casing fastened to the motor housing, the impeller casing comprising an inlet end for accepting the circulating fluid flowing into the impeller casing, the inlet end being configured for attachment to a pipe of the hydronic heating system, an impeller zone into which the impeller extends from the motor, the impeller zone being in fluid communication with the inlet of the impeller casing, and an outlet end for discharging the circulating fluid flowing from the impeller casing, the outlet end being configured for attachment to a pipe of the hydronic heating system.

8. A priority circulator system comprising a multi-zone hydronic system having a plurality of zones, an integrated zoning circulator associated with each zone, each zone having a thermostat associated with the zoning circulator and, each integrated zoning circulator comprising:

a wet-rotor circulator motor disposed within a motor housing, and;

a priority controller, disposed within a housing integrated with the motor housing controller said priority controller comprising a manual switch having a setting selectable by a user of the hydronic system for establishing the priority of operation for the zoning circulator relative to other zoning circulators in the system; and circuitry, connected to the zoning circulator and manual switch, adapted to operate the zoning circulator and to prevent simultaneous operation of zoning circulators in other zones that have manual switch settings of lower priority than the selected setting of the manual switch, when the thermostat, associated with the zone in which the zoning circulator is disposed, calls for the zoning circulator in that zone to operate.

9. The priority circulator system of claim 8 wherein said circuitry of each priority controller is adapted to allow a plurality of priority controllers to be activated simultaneously, so that those zoning circulators have priority over the other zoning circulators.

10. The priority controller system of claim 8 further comprising a communication bus connecting each priority controller and wherein said circuitry of each priority controller further comprises a microcontroller, connected to the communication bus, for controlling the operation of the circulator on the basis of priority settings of manual switches of other priority controllers of the hydronic system.

11. The priority controller system of claim 8 wherein said circuitry further comprises electrical inlet ports for accepting low voltage thermostat leads, low voltage heat exchanger control leads, high voltage supply leads, and priority line power leads, an electrical outlet port connected to the circulator, a voltage transforming device configured for transforming a high voltage delivered on the high voltage supply leads to a low voltage, an electrical switching device having low voltage activation input terminals, the switching device being configured to switch a low voltage switched output terminal and a high voltage switched output terminal when low voltage is supplied to the activation input terminals, low voltage conductors within the housing for connecting the low voltage thermostat leads to the low voltage output of the voltage transforming device and to the low voltage activation terminals of the electrical switching device and for connecting the low voltage switched output terminal to the low voltage heat exchanger control leads, and high voltage conductors within the housing for supplying the high voltage from the high voltage supply leads to the manual switch and for connecting the high voltage switched output terminal of the electrical switching device between the manual switch and the electrical outlet port.

12. The priority controller system of claim 8 wherein each said wet rotor circulator motor further comprises:

a stator disposed within the motor housing and sealed from the circulating fluid, a rotor housing disposed within the motor housing within the stator, the rotor housing being unsealed from the circulating fluid so that the fluid enters the rotor housing, a rotor disposed within the rotor housing and in contact with the fluid, and an impeller affixed to one end of the rotor, the stator and rotor configured with respect to one another so that the rotor is caused to rotate when the stator is energized;

an impeller casing fastened to the motor housing, the impeller casing comprising an inlet end for accepting the circulating fluid flowing into the impeller casing, the inlet end being configured for attachment to a pipe of the hydronic heating system, an impeller zone into which the impeller extends from the motor, the impeller zone being in fluid communication with the inlet of the impeller casing, and an outlet end for discharging the circulating fluid flowing from the impeller casing, the outlet end being configured for attachment to a pipe of the hydronic heating system.

\* \* \* \* \*